(12) United States Patent
Kramlich et al.

(10) Patent No.: US 8,701,441 B2
(45) Date of Patent: Apr. 22, 2014

(54) METHOD OF MAKING INORGANIC, METAL OXIDE SPHERES USING MICROSTRUCTURED MOLDS

(75) Inventors: David C. Kramlich, Roseville, MN (US); John L. Vandenberg, Maplewood, MN (US); Matthew H. Frey, Cottage Grove, MN (US); Scott R. Culler, Burnsville, MN (US); Kathleen M. Schakel-Carlson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1205 days.

(21) Appl. No.: 11/465,848

(22) Filed: Aug. 21, 2006

(65) Prior Publication Data

US 2008/0041103 A1    Feb. 21, 2008

(51) Int. Cl.
*C03B 19/10* (2006.01)
(52) U.S. Cl.
USPC .......................... 65/21.3; 65/21.4; 65/21.1
(58) Field of Classification Search
USPC .................. 264/442–445; 65/396, 21.1–21.5
See application file for complete search history.

(56) References Cited

U.S. PATENT DOCUMENTS

| | | | | |
|---|---|---|---|---|
| 2,390,354 A | * | 12/1945 | Clapp | 264/669 |
| 3,233,022 A | * | 2/1966 | Henry et al. | 264/123 |
| 3,294,558 A | | 12/1966 | Searight et al. | |
| 3,459,565 A | * | 8/1969 | Jones et al. | 501/39 |
| 3,493,403 A | | 2/1970 | Tung et al. | |
| 3,537,833 A | * | 11/1970 | Gossie et al. | 65/21.4 |
| 3,567,807 A | * | 3/1971 | Shannon | 64/29.1 |
| 3,598,373 A | * | 8/1971 | Inman | 264/5 |
| 3,620,701 A | * | 11/1971 | Janetos et al. | 65/451 |
| 3,804,608 A | * | 4/1974 | Gaskell et al. | 65/33.8 |
| 3,809,543 A | * | 5/1974 | Gaskell et al. | 65/33.8 |
| 3,829,403 A | * | 8/1974 | Lent et al. | 64/44 |
| 3,838,998 A | * | 10/1974 | Matthews et al. | 65/21.2 |
| 3,850,788 A | * | 11/1974 | Greig et al. | 428/375 |
| 4,009,064 A | | 2/1977 | Andrews | |
| 4,063,916 A | | 12/1977 | De Vos et al. | |
| 4,349,456 A | | 9/1982 | Sowman | |
| 4,381,963 A | * | 5/1983 | Goldstein et al. | 156/245 |
| 4,385,917 A | | 5/1983 | Aston et al. | |
| 4,391,646 A | | 7/1983 | Howell | |
| 4,425,148 A | * | 1/1984 | van Geel et al. | 65/142 |
| 4,564,556 A | * | 1/1986 | Lange | 428/325 |
| 4,837,069 A | | 6/1989 | Bescup et al. | |
| 4,849,001 A | * | 7/1989 | Drake et al. | 65/17.5 |

(Continued)

FOREIGN PATENT DOCUMENTS

JP    60-176933 A    9/1985
JP    2004074445    *    3/2004  ............. B29C 39/36

(Continued)

OTHER PUBLICATIONS

PCT Search Report, PCT/US2007/075770.

(Continued)

*Primary Examiner* — Jodi C Franklin
(74) *Attorney, Agent, or Firm* — Nicole J. Einerson

(57) ABSTRACT

A process for making inorganic, metal oxide spheres that includes exposing solidified, molded microparticles that include a glass precursor composition to a temperature sufficient to transform the molded microparticles into molten glass and cooling the molten glass to form inorganic, metal oxide spheres.

31 Claims, 3 Drawing Sheets

(56) References Cited

U.S. PATENT DOCUMENTS

| | | | |
|---|---|---|---|
| 4,888,036 A * | 12/1989 | Clasen | 65/17.2 |
| 4,961,770 A * | 10/1990 | Johnson et al. | 65/21.3 |
| 4,985,186 A * | 1/1991 | Nose et al. | 264/1.7 |
| 4,986,941 A * | 1/1991 | Hendrix et al. | 264/13 |
| 5,069,833 A * | 12/1991 | Yokoi et al. | 264/442 |
| 5,114,881 A * | 5/1992 | Kaneko et al. | 501/12 |
| 5,201,916 A * | 4/1993 | Berg et al. | 51/293 |
| 5,319,007 A * | 6/1994 | Bright | 523/516 |
| 5,500,273 A * | 3/1996 | Holmes et al. | 428/147 |
| 5,549,962 A * | 8/1996 | Holmes et al. | 428/144 |
| 5,614,232 A * | 3/1997 | Torigoe et al. | 425/545 |
| 5,628,952 A * | 5/1997 | Holmes et al. | 264/331.11 |
| 5,634,956 A * | 6/1997 | Suh et al. | 65/33.1 |
| 5,691,059 A | 11/1997 | Moh | |
| 5,713,974 A * | 2/1998 | Martin et al. | 65/17.2 |
| 5,769,918 A * | 6/1998 | Burt et al. | 65/17.3 |
| 5,853,446 A * | 12/1998 | Carre et al. | 65/17.3 |
| 5,942,015 A * | 8/1999 | Culler et al. | 51/295 |
| 5,984,988 A | 11/1999 | Berg | |
| 6,009,724 A | 1/2000 | Helsen | |
| 6,245,700 B1 * | 6/2001 | Budd et al. | 501/34 |
| 6,296,826 B1 * | 10/2001 | Fujinoki et al. | 423/335 |
| 6,335,083 B1 * | 1/2002 | Kasai et al. | 428/143 |
| 6,358,531 B1 * | 3/2002 | Day et al. | 424/489 |
| 6,531,222 B1 * | 3/2003 | Tanaka et al. | 428/402 |
| 6,578,381 B2 * | 6/2003 | Nishimura et al. | 65/21.1 |
| 6,630,083 B1 * | 10/2003 | Nunez et al. | 264/1.38 |
| 6,645,624 B2 | 11/2003 | Adefris et al. | |
| 6,651,730 B2 * | 11/2003 | Jiang et al. | 164/529 |
| 6,914,024 B2 | 7/2005 | Anderson | |
| 7,344,575 B2 * | 3/2008 | Thurber et al. | 51/298 |
| 2001/0025001 A1 * | 9/2001 | Oda et al. | 501/32 |
| 2001/0030811 A1 * | 10/2001 | Kasai et al. | 359/586 |
| 2002/0139144 A1 * | 10/2002 | Watanabe et al. | 65/21.3 |
| 2002/0153623 A1 * | 10/2002 | Gobron et al. | 264/1.1 |
| 2003/0110567 A1 * | 6/2003 | Kawamura et al. | 5/655.9 |
| 2003/0186405 A1 * | 10/2003 | Lee et al. | 435/182 |
| 2004/0148870 A1 * | 8/2004 | Celikkaya et al. | 51/309 |
| 2004/0148967 A1 * | 8/2004 | Celikkaya et al. | 65/21.2 |
| 2004/0222089 A1 * | 11/2004 | Inoue et al. | 204/298.12 |
| 2004/0229346 A1 * | 11/2004 | Kohara et al. | 435/287.2 |
| 2004/0259713 A1 * | 12/2004 | Frey | 501/33 |
| 2005/0060947 A1 * | 3/2005 | McArdle et al. | 51/298 |
| 2005/0118939 A1 * | 6/2005 | Duescher | 451/527 |
| 2005/0163951 A1 * | 7/2005 | Oles et al. | 428/35.7 |
| 2006/0122049 A1 * | 6/2006 | Marshall et al. | 501/27 |
| 2008/0041103 A1 * | 2/2008 | Kramlich et al. | 65/17.3 |
| 2008/0079182 A1 * | 4/2008 | Thompson et al. | 264/1.9 |
| 2008/0299875 A1 * | 12/2008 | Duescher | 451/56 |

FOREIGN PATENT DOCUMENTS

| | | |
|---|---|---|
| JP | 17-272292 A | 10/2005 |
| KR | 10-2003-0040314 A | 5/2003 |
| KR | 10-2004-0034111 A | 4/2004 |
| WO | WO 93-14037 A1 | 7/1993 |

OTHER PUBLICATIONS

"Fusing Recycled Glass" *Clean Washington Center* http://www.cwc.org/g1_bp/gbp3-0401.htm, pp. 2, [Apr. 2000].

Yu et al, "Experimental Investigation and Numerical Simulation of Injection Molding With Micro-Features", Polymer Engineering and Science, May 2002, vol. 42, No. 5, pp. 871-888.

Supplementary European Search Report EP 07 81 4014; Dec. 9, 2013; 2 pgs.

* cited by examiner

METHOD OF MAKING INORGANIC, METAL OXIDE SPHERES USING MICROSTRUCTURED MOLDS

BACKGROUND

The invention relates to forming inorganic, metal oxide spheres from molded microparticles.

A variety of methods are currently used to produce glass beads, which are also referred to as glass microspheres. These processes often require repeated steps of pulverizing and classifying particulate material in an effort to obtain glass beads that exhibit a relatively narrow size distribution. Some glass bead manufacturing processes include generating a particulate feed material, followed by conversion of the particulate feed material to a glass by melting. The particulate feed materials can be formed by pulverizing glass particles (or components that form glass when heated at a sufficiently high temperature) and intimately blending, e.g., by milling, the pulverized particles with a volatile liquid such as water. A binder such as dextrin or starch is sometimes added to bind together the milled raw material particles. The slurry of milled material is then dried, e.g., in bulk or by spraying the composition into a dry atmosphere maintained at an elevated temperature to yield dried feed material. In the case of spray-drying, the dried agglomerates can then be converted directly into glass. Feed material dried in bulk often takes the form of a cake. A dried cake can be converted to useful agglomerates by pulverizing. Optionally, the cake can be sintered before pulverizing to pre-react some components of the cake. In the case of bulk drying, the pulverized agglomerates must be classified to achieve a sufficiently narrow size range of finished beads. Classification of the agglomerates is undesirable, due to added cost and energy usage.

Once the classified agglomerates have been generated, glass microspheres can then be formed using a variety of melting methods. In one melting method, the agglomerates of raw material are passed through a flame having a temperature sufficient to melt the particles and through a distance sufficient to spheroidize the melted particles. For many raw materials exposure to a flame having a temperature of from about 1500° C. to about 2000° C. is sufficient. The melted particles are then quenched, e.g., in air or water, to form solid beads. The quenched particles optionally can be crushed to form particles of a smaller desired size for the final beads and then further processed. In other methods, the raw material is melted and the melted material is poured continuously into a jet of high velocity air. Molten droplets form as the jet impinges on the liquid stream. The velocity of the air and the viscosity of the melt are adjusted to control the size of the droplets. The molten droplets are then rapidly quenched, e.g., in air or water, to form solid beads. Beads formed by such melting methods are normally composed of a vitreous material that is essentially completely amorphous (i.e., noncrystalline). The beads are often referred to as "vitreous," "amorphous," or simply "glass" beads or microspheres. Beads formed by liquid glass atomization often exhibit a wide size distribution, requiring classification (e.g., screening) of the product, which leads to excess cost and energy use.

These processes often require many steps of pulverizing, classifying, or sintering to achieve particles having a desired size and size distribution.

SUMMARY

In one aspect, the invention features a process for making inorganic, metal oxide spheres, the process including exposing solidified, molded microparticles that include a glass precursor composition to a temperature sufficient to transform the molded microparticles into molten glass, and cooling the molten glass to form inorganic, metal oxide spheres.

In one embodiment, the process is for making glass microspheres and the process includes exposing solidified, molded microparticles that include a glass precursor composition to a temperature sufficient to transform the molded microparticles into molten glass droplets, maintaining the molten glass droplets at the transforming temperature for a period of time sufficient such that the molten glass droplets form into spheres, and cooling the molten glass droplets to form glass microspheres.

The invention features a process that facilitates production of inorganic, metal oxide spheres (e.g., glass, glass-ceramic, glass-bonded ceramic and crystalline ceramic beads) having a narrow size distribution. The process also enables the ability to form inorganic, metal oxide spheres having a predetermined particle size and to tune the particle size of spheres as desired.

The relatively narrower size distribution of the molded microparticles allows the flame used to transform the molded microparticles into molten droplets to be adjusted to optimize performance based on the target size of the sphere formed there from. In the case of glass beads, the narrow size distribution of the molded microparticles allows optimization of the requisite vitrification energy, resulting in a more consistent index of refraction of the glass beads produced thereby. In some cases, the process can reduce or eliminate the need for the subsequent heat treatment step that is sometimes done to improve the properties of microspheres.

The invention provides a process that enables a quick change over from one sphere size, sphere chemistry or both to another relative to existing glass bead manufacturing processes, which in some embodiments can increase the speed of the process, decrease the waste associated with the change-over, and improve the overall utilization rate and percentage yield of the system.

Other features and advantages will be apparent from the following description of the preferred embodiments, the drawings, and the claims.

GLOSSARY

In reference to the invention, these terms have the meanings set forth below:

The term "inorganic metal oxide sphere" means glass, glass-ceramic, glass-bonded ceramic, crystalline ceramic spheres or a combination thereof.

The term "glass" means an inorganic, metal oxide product of fusion that has cooled to a rigid condition without crystallizing such that it is essentially amorphous, i.e., at least 95% by volume, as determined using x-ray diffraction.

The term "glass-ceramic" means an inorganic, metal oxide formed initially as a glass that is subsequently devitrified such that it exhibits an at least partially crystalline phase and optionally some residual glass phase.

The term "devitrify" means to convert, at least partially from a glassy state to a crystalline state.

The term "glass-bonded ceramic" means an inorganic, metal oxide that includes a glassy phase and a crystalline phase.

The term "crystalline ceramic" means an inorganic, metal oxide that is essentially crystalline having less than 1% by volume glassy phase.

The term "glass precursor" means a material that is capable of forming at least one of glass, glass-ceramic, glass-bonded ceramic, and crystalline ceramic when heated to a sufficient temperature and then cooled.

The term "handleable molded microparticle" means a molded microparticle that has been sufficiently solidified such that it maintains its molded shape when demolded.

The term "sphere" means a particle that is substantially, although perhaps not exactly, spherical and further refers to both beads and bubbles.

The term "bead" refers to a solid particle that is substantially, although perhaps not exactly, spherical.

The term "bubble" refers to a hollow particle that is substantially, although perhaps not exactly, spherical.

The term "fused" refers to preparation by a melt process.

The term "microsphere" refers to spheres having a diameter less than about 1 millimeter.

The term "microbead" refers to beads having a diameter less than about 1 millimeter.

The term "microbubble" refers to bubbles having a diameter less than about 1 millimeter.

The term "molded microparticle" refers to a particle that has a predetermined shape as a result of having been formed in a mold cavity and has a volume no greater than 8,000,000,000 μm³.

DETAILED DESCRIPTION

Figure 1:
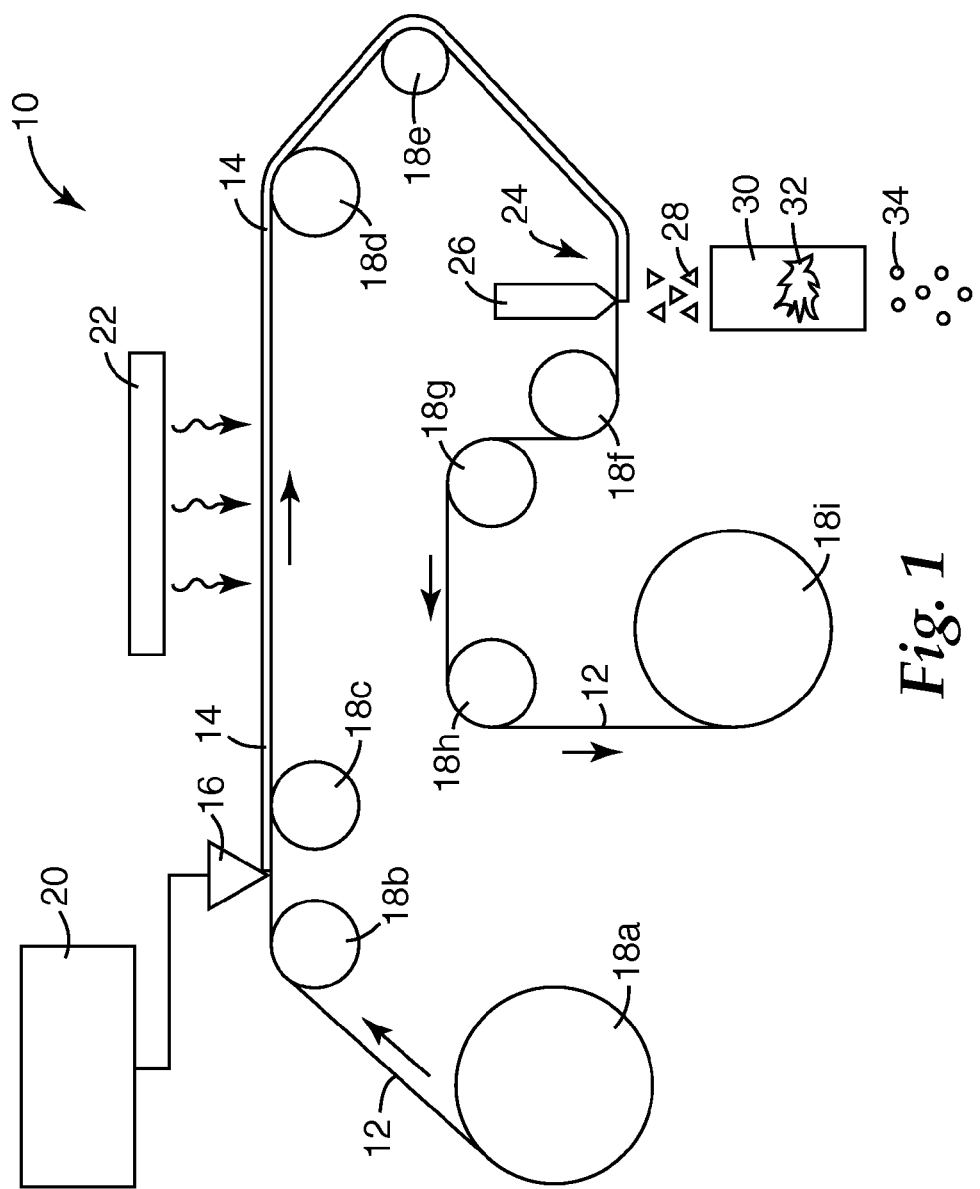
FIG. 1 is a schematic view of a process for making inorganic, metal oxide spheres using micromold tooling according to one exemplary embodiment of the invention.

The process for making inorganic, metal oxide spheres includes forming a glass precursor composition, filling a number of micromold cavities with the glass precursor composition, solidifying (e.g., drying, curing or a combination thereof) the glass precursor composition to form molded microparticles, demolding the molded microparticles from the mold cavities, passing the molded microparticles through a flame to melt the molded microparticles, which then form molten droplets as they continue passing through a distance, quenching the molten droplets to form hardened spheres, and collecting the resulting inorganic, metal oxide spheres. The residence time in the flame and the length of the path the molten material travels are sufficient such that the molten material forms spherical particles. The process is useful for forming inorganic, metal oxide spheres including, e.g., beads, bubbles, microspheres (e.g., microbeads and microbubbles), and combinations thereof.

The process can be used to form spheres having a variety of dimensions. The process is particularly useful for forming spheres that are spherical or substantially spherical, i.e., a majority of the beads are round as opposed to having a non-linear circumference or being oval or egg-shaped. The spheres can have a variety of properties including, e.g., being solid, having at least one internal void, being hollow, having surface imperfections, e.g., a surface void, and combinations thereof. For many applications solid spheres are preferred. In other applications, hollow spheres are useful. The spheres can have any desirable diameter. Preferably the mean sphere diameter is from about 10 μm to about 2 mm, at least about 10 μm, at least about 20 μm, at least about 50 μm, at least about 55 μm, no greater than about 2 mm, no greater than about 1 mm, no greater than about 500 μm, no greater than about 300 μm, no greater than about 250 μm, no greater than about 100 μm, no greater than about 75 μm, or even about 60 μm. The process can also form spheres having a relatively narrow size distribution. Preferably the size distribution of the resulting spheres is such that the spheres have an average absolute deviation from the mean of no greater than about 20%, or even no greater than about 10%. The spheres optionally can be screened to achieve a desired size distribution.

The diameter of a sphere is a function of various process parameters including, e.g., the size of the molded microparticles, the components present in the glass precursor composition, and the degree of densification of the glass precursor composition.

The glass precursor composition used to form the spheres includes glass precursor particles and optionally a vehicle that includes at least one of water, volatile organic liquid, and fugitive binder, i.e., a binder that dissipates during the elevated temperature processing used in forming the spheres. The glass precursor particles are preferably dispersed in the vehicle such that the composition forms a dispersion (e.g., a slurry). One example of a useful glass precursor composition is one that includes glass precursor particles and water and is in the form of a slurry.

The glass precursor particles are capable of forming at least one of glass, glass-glass-ceramic, glass-bonded ceramic, and crystalline ceramic upon heating to a sufficient temperature. Useful glass, glass-ceramic, glass-bonded ceramic, and crystalline ceramic forming compounds include metal oxides. Useful metal oxides form from a variety of metals including, e.g., aluminum, silicon, thorium, tin, titanium, yttrium, zirconium, boron, phosphorus, germanium, lead, bismuth, tantalum, niobium, antimony, arsenic, lanthanum, gadolinium, lithium, sodium, potassium, magnesium, calcium, strontium, barium, zinc, and mixtures thereof. Useful metal oxides include, e.g., $Al_2O_3$, $SiO_2$, $ThO_2$, $SnO_2$, $TiO_2$, $Y_2O_3$, $ZrO_2$, $B_2O_3$, $P_2O_5$, $GeO_2$, $PbO$, $Bi_2O_3$, $Ta_2O_5$, $Nb_2O_5$, $Sb_2O_5$, $As_2O_3$, $La_2O_3$, $Gd_2O_3$, $Li_2O$, $Na_2O$, $K_2O$, $MgO$, $CaO$, $SrO$, $BaO$, and $ZnO$, and mixtures thereof. An example of a metal whose oxides can serve as useful material in admixture with the above-mentioned oxides is beryllium. Useful metal oxides that are often colorless or only weakly colored include, e.g., $BaO$, $BeO$, $Bi_2O_3$, $B_2O_3$, $CaO$, $PbO$, $Sb_2O_5$, $SrO$, $Ta_2O_5$, $MgO$, and $ZnO$ and mixtures thereof. The glass precursor composition can also include small amounts of various metals including, e.g., iron, manganese, cobalt, vanadium, copper, nickel, tungsten, molybdenum, praseodymium, neodymium, europium, dysprosium, holmium, erbium, thulium, ytterbium, samarium, and combinations thereof. Other useful glass bead precursors include, e.g., metal oxide compounds that include more than one metal species including, e.g., $BaTiO_3$, wollastonite (i.e., $CaSiO_3$) and combinations thereof. The glass precursor composition can also include a color agent. Useful color agents include, e.g., $CeO_2$, $Fe_2O_3$, $CoO$, $Cr_2O_3$, $NiO$, $CuO$, $MnO_2$, and mixtures thereof. The glass precursor composition can also optionally include rare earth elements including, e.g., europium, for fluorescence.

The glass precursor can be provided in a variety of forms including, e.g., particulate (i.e., powder). The glass precursor is preferably in the form of particles having a cross-sectional dimension no greater than about 20 μm, no greater than about 10 μm, preferably no greater than about 5 μm, or even from about 1 μm to about 10 μm.

The glass precursor is preferably present in the glass precursor composition in an amount of from about 10% by weight to about 100% by weight, from about 20% by weight to about 90% by weight, or even from about 50% by weight to about 85% by weight. Examples of useful glass precursor particle mixtures are described in U.S. Pat. Nos. 3,294,558, 3,493,403, 4,063,916, 4,349,456, 4,385,917, 4,564,556, 4,837,069, 6,245,700, 6,335,083, and 6,914,024, and U.S. Patent Publication No. 2004/0259713, all of which are incorporated herein.

The vehicle is preferably present in the glass precursor composition in an amount no greater than about 90% by weight, no greater than about 70% by weight, no greater than about 60% by weight, at least about 5% by weight, from about 0% by weight to about 50% by weight, from about 5% by weight to about 50% by weight, from about 10% by weight to about 40% by weight, or even from about 20% by weight to about 30% by weight.

Aqueous-based glass precursor compositions can include other additives including, e.g., hydrocolloids (e.g., xanthan, maltodextrin, galactomanan and tragacanth) polysaccharides, natural gums (e.g., gum Arabic), starch derivates, surfactants (e.g., cationic, anionic, nonionic, and zwitterionic) including, e.g., sodium lauryl sulfate polysorbate, and sodium 2-ethylhexyl sulfate, and combinations thereof.

Examples of useful volatile organic liquids include methanol, ethanol, isopropyl alcohol, butyl alcohol, heptane, and toluene.

Useful fugitive binders include water soluble and water dispersible binders including, e.g., dextrin, starch, cellulose, hydroxyethylcellulose, hydroxypropylcellulose, carboxyethylcellulose, carboxymethylcellulose, carragenan, scleroglycan, xanthan gum, guar gum, hydroxypropylguar gum and combinations thereof.

Other suitable binders include, e.g., waxes, thermoplastic polymers, radiation curable resins, i.e., resins capable of being cured by radiation energy or thermal energy, and combinations thereof. Examples of suitable waxes include natural waxes (e.g., beeswax and vegetable waxes (e.g., carnauba and candelilla)), synthetic waxes, mineral waxes, e.g., petroleum waxes including paraffin wax, microcrystalline wax, Fischer-Tropsch waxes, and mixtures thereof.

Useful thermoplastic polymers include, e.g., polyalkylenes, e.g., polyolefins (polyethylene, polypropylene, and polybutylene), polyamides, polyimides, poly(phenylenediamine terephthalamide), polyesters, polyacrylates, polymethacrylates, polyvinyl alcohol, polyvinyl acetate, ethylene vinyl acetate, vinyl chloride homopolymers and copolymers, and combinations thereof.

Curable binders are those binders that undergo crosslinking when exposed to radiation energy, thermal energy and combinations thereof Useful sources of radiation energy include, e.g., electron beam energy, ultraviolet light, visible light, and laser light. If ultraviolet or visible light is utilized, a photoinitiator is preferably included in the composition. A photoinitiator is optional when a source of electron beam energy is utilized.

Examples of useful radiation curable binders include acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and combinations thereof. The term "acrylate" includes both acrylates and methacrylates.

Examples of useful acrylated urethanes include diacrylate esters of hydroxy terminated isocyanate extended polyesters and polyethers.

Useful acrylated epoxies include, e.g., diacrylate esters of epoxy resins including, e.g., the diacrylate esters of bisphenol A epoxy resin.

Useful ethylenically unsaturated compounds include, e.g., monomeric and polymeric compounds that contain atoms of carbon, hydrogen and oxygen, and optionally nitrogen, halogen, and combinations thereof. At least one of oxygen and nitrogen atoms are generally present in ether, ester, urethane, amide, and urea groups. Some useful ethylenically unsaturated compounds have a molecular weight of less than about 4,000 and are the ester reaction product of at least one of aliphatic monohydroxy groups and aliphatic polyhydroxy groups, and an unsaturated carboxylic acid (e.g., acrylic acid, methacrylic acid, itaconic acid, crotonic acid, isocrotonic acid, maleic acid and combinations thereof). Useful acrylates include, e.g., methyl methacrylate, ethyl methacrylate, ethylene glycol diacrylate, ethylene glycol methacrylate, hexanediol diacrylate, triethylene glycol diacrylate, trimethylolpropane triacrylate, glycerol triacrylate, pentaerthyitol triacrylate, pentaerythritol methacrylate, pentaerythritol tetraacrylate and combinations thereof.

Other useful ethylenically unsaturated compounds include, e.g., monoallyl, polyallyl, and polymethylallyl esters and amides of carboxylic acids including, e.g., diallyl phthalate, diallyl adipate, and N,N-diallyladipamide. Still other useful ethylenically unsaturated compounds include styrene, divinyl benzene, and vinyl toluene. Other nitrogen-containing, ethylenically unsaturated compounds include tris(2-acryloyl-oxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

Suitable aminoplast include monomeric and oligomeric aminoplast. Useful aminoplast resins have at least one pendant α,β-unsaturated carbonyl group per molecule. These α,β-unsaturated carbonyl groups can be acrylate, methacrylate, or acrylamide groups. Examples of such resins include N-hydroxymethyl-acrylamide, N,N'-oxydimethylenebisacrylamide, ortho and para acrylamidomethylated phenol, acrylamidomethylated phenolic novolac, and combinations thereof. These materials are further described in U.S. Pat. Nos. 4,903,440 and 5,236,472, both of which are incorporated herein.

Examples of isocyanurate derivatives having at least one pendant acrylate group and isocyanate derivatives having at least one pendant acrylate group are described in U.S. Pat. No. 4,652,274 and incorporated herein.

Examples of suitable vinyl ethers include vinyl ether functionalized urethane oligomers.

Epoxies have an oxirane ring and are polymerized by the ring opening. Epoxy resins include monomeric epoxy resins and polymeric epoxy resins. These resins can vary greatly in the nature of their backbones and substituent groups. The backbone, for example, may be of any type normally associated with epoxy resins and substituent groups thereon can be any group free of an active hydrogen atom that is reactive with an oxirane ring at room temperature. Representative examples of substituent groups for epoxy resins include halogens, ester groups, ether groups, sulfonate groups, siloxane groups, nitro groups, and phosphate groups. Examples of epoxy resins include 2,2-bis[4-(2,3-epoxypropoxy)phenyl]

propane (diglycidyl ether of bisphenol A). Other suitable epoxy resins include glycidyl ethers of phenol formaldehyde novolac. The epoxy resins can polymerize via a cationic mechanism with the addition of an appropriate photoinitiator(s). These resins are further described in U.S. Pat. Nos. 4,318,766 and 4,751,138, both of which are incorporated herein.

Examples of useful photoinitiators that generate a free radical source when exposed to ultraviolet light include, e.g., organic peroxides, azo compounds, quinones, benzophenones, nitroso compounds, acyl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Examples of photoinitiators that generate a free radical source when exposed to visible radiation are described in U.S. Pat. No. 4,735,63 and incorporated herein.

Cationic photoinitiators generate an acid source to initiate the polymerization of an epoxy resin or a urethane. Cationic photoinitiators can include a salt having an onium cation and a halogen-containing complex anion of a metal or metalloid. Other cationic photoinitiators include a salt having an organometallic complex cation and a halogen-containing complex anion of a metal or metalloid. Useful photoinitiators are described in U.S. Pat. Nos. 4,751,138 and 4,985,340 and European Patent Application Nos. 306,161 and 306,162, all of which are incorporated herein. Still other cationic photoinitiators include an ionic salt of an organometallic complex in which the metal is selected from the elements of Periodic Groups IVB, VB, VIB, VIIB, and VIIIB.

The glass precursor composition used to form inorganic metal oxide bubbles can optionally include a blowing agent. Useful blowing agents include, e.g., sulfur and compounds of oxygen and sulfur. Particularly useful microbubble precursor compositions are disclosed, e.g., in U.S. Pat. Nos. 4,391,646, 4,767,726 and 5,691,059, and incorporated herein.

The glass precursor composition can be prepared by combining the various components of the composition using any suitable technique including, e.g., mixing (e.g., high shear mixing), air stirring, tumbling and combinations thereof. A vacuum can be used during mixing to minimize entrapment of air in the glass bead precursor composition.

The micromold cavities are configured to have a volume proportional to the desired size of the sphere formed from the molded microparticles. A variety of factors influence the selection of an appropriate volume for the micromold cavity including, e.g., the desired size of the resulting sphere, the dimensions of the micromold cavities, the percent solids in the glass precursor composition, and the expected percent densification (i.e., shrinkage) resulting from the melting and/or fusing process. To obtain a spherical bead having a diameter of about D, for example, a useful cavity volume can be determined according to the following equation:

$$V = 4/3(\pi)(D/2)^3 \div (\% \text{ solids}) \div (\% \text{ densification}),$$

where D is the desired diameter of the bead, % solids refers to the % solids present in the glass precursor composition, and % densification is the amount of volume shrinkage expected from the glass precursor composition. Useful cavity volumes include, e.g., at least about 50,000 $\mu m^3$, at least about 100,000 $\mu m^3$, at least about 200,000 $\mu m^3$, no greater than about 500,000 $\mu m^3$, no greater than about 300,000 $\mu m^3$, no greater than about 1,000,000 $\mu m^3$, no greater than about 8,000,000,000 $\mu m^3$ or even from about 10,000 $\mu m^3$ to about 500,000 $\mu m^3$.

The micromold cavity can exhibit any shape including, e.g., polyhedron (e.g., cube, prism, pyramid, tetrahedron, pentahedron, hexahedron, octahederon, decahederon, parallelpiped (e.g., rhombohedron), and diamond), hemisphere, cylinder, arcuate, arcuate terminated cylinder, cone, frustoconical cone, a thin body having opposed polygonal faces including, e.g., triangle, square, rectangle, rhomboid, pentagon, hexagon, heptagon, and octagon faces, gumdrop, bell, and combinations thereof.

The micromold cavity can exist in any suitable substrate. Preferably a number of micromold cavities are present in a substrate. The substrate in which the micromold cavities are present is referred to herein as a "production tool." The production tool can be a three-dimensional body having at least one continuous surface. The continuous surface contains at least one opening, preferably a number of openings, formed in the continuous surface. Each opening provides access to a cavity formed in the three-dimensional body. The production tool can be of a variety of constructions including, e.g., a web, e.g., an endless belt, a sheet, a roll (e.g., a coating roll), a sleeve mounted on a coating roll, and combinations thereof. The production tool can be constructed to allow for continuous operation including, e.g., endless belts and cylindrical coating rolls that rotate about an axis. Examples of useful endless belt production tools are described in U.S. Pat. No. 5,549,962 and incorporated herein. Apparatus utilizing a two-ended web can also be adapted to provide continuous operations.

A single production tool can contain a number of cavities having the same size and shape, having different shapes, having different sizes, and combinations thereof. In the case where the substrate is in the form of a web or a belt, the cavity can extend completely through the production tool. The cavities can abutt or have land areas between them. Increasing the amount of land area between cavities can assist in preventing bridging of the glass bead precursor composition from one mold cavity to another. Sloped sides on cavities can provide a variety of advantages including, e.g., easier filling of the production tool, easier removal of the solidified, molded microparticle from the production tool, and combinations thereof.

The production tool can be constructed from a variety of materials including, e.g., metals (e.g., nickel), polymers (e.g., polyolefins, e.g., polypropylene, polyamide, polyimide and combinations thereof), ceramic materials, and combinations thereof. A production tool made of metal can be fabricated by diamond turning, engraving, photolithography, hobbing, etching, knurling, assembling a plurality of metal parts machined in the desired configuration, die punching, other mechanical means, electroforming, and combinations thereof. Useful techniques for fabricating production tools are described in the Encyclopedia of Polymer Science and Technology, Vol. 8, John Wiley & Sons, Inc. (1968), p. 651-665, and U.S. Pat. No. 3,689,346, both of which are incorporated herein.

The metal production tool may include a release agent (e.g., a release coating) on the surface of the mold, e.g., the mold cavities, to enable easier removal of the molded microparticles from the cavities and to minimize wear of the production tool. Examples of suitable release coatings include hard coatings such as metal carbides, metal nitrides, metal borides, diamond, diamond-like carbon, and combinations thereof.

A metal production tool can also be treated, e.g., by heating, cooling, and combinations thereof. The temperature of the tool may allow easier processing, more rapid curing, and easier release of the shaped microparticles from the tool.

Polymeric production tools can be manufactured using a variety of techniques. Some polymeric production tools are replicated from an original master tool. Polymeric tools can be made to allow radiation to pass from the radiation source through the production tool and into the glass bead precursor composition, which is particularly useful for glass bead precursor compositions that include a radiation curable component. Polymeric production tools can also be prepared by coating a molten thermoplastic resin, such as polypropylene, onto a master tool. A metal master tool can be made by the same methods used to make metal production tools. The molten resin is then quenched to give a thermoplastic replica of the master tool. This polymeric replica can then be utilized as the production tool. If the production tool is made from a thermoplastic material, the conditions of the method in which the tool is used should be set such that processing conditions do not adversely affect the production tool.

The polymeric production tool may also optionally include a release agent to improve the releasability of the molded microparticle from the production tool. The release agent can be in a variety of forms including, e.g., a release coating on the surface of the tool (e.g., the surface of the cavities), a release agent incorporated into the composition of the tool, and combinations thereof. Useful release agent coating compositions include, e.g., silicone-based compositions, fluorochemical-based compositions, and combinations thereof. A release agent optionally can be present in the polymer from which the production tool is formed. Useful release agents include silicone-based based materials and fluorochemical-based materials. Alternatively or in addition the production can include a thermoplastic polymer that exhibits release properties, an example of which is described in WO 92/15626, and incorporated herein.

Other methods of preparing production tools are described in U.S. patent application Ser. No. 08/004,929, filed Jan. 14, 1993, now abandoned, and incorporated herein.

The glass precursor composition can be placed in the micromold cavity using any suitable technique including, e.g., gravity feeding, pumping, coating (e.g., die coating, knife coating, spray coating), vacuum drop die coating, and combinations thereof. Alternatively or in addition, the glass bead precursor can be introduced to the cavities of the production tool by transfer via a carrier web.

Although the glass precursor composition is only required to fill a portion of the cavity, the glass precursor composition preferably completely fills the cavity in the surface of the production tool so that the resulting molded microparticle will contain few voids or imperfections or be free of the same. Imperfections can alter the size of the molded microparticle, which can impact the size distribution of the spheres formed therefrom.

It is sometimes preferred to alter the viscosity of the glass precursor composition prior to introducing the composition into the cavity of micromold. Various methods can be used to lower the viscosity of the glass precursor composition prior to or during the filling process including, e.g., heating the composition prior to introducing the composition into the production tool (e.g., to a temperature in the range of from about 40° C. to 90° C.) so that it can flow more readily into the cavities of the production tool, subjecting the glass bead precursor composition to ultrasonic energy (e.g., vibration) during the mixing step or immediately prior to the coating step, applying a vacuum or pressure, rolling bank, adding liquid to the composition, and combinations thereof.

The filled micromold can optionally undergo a scraping process to remove excess glass precursor composition from the micromold cavity, from any land area that exists between the micromold cavities and combinations thereof. The scraping process can occur at any suitable time including, e.g., substantially simultaneously with the filling of a number of cavities, subsequent to filling a number of cavities, and combinations thereof.

The glass precursor composition is then at least partially solidified while in the micromold cavities. Partial solidification can include, e.g., drying, curing (e.g., crosslinking) and combinations thereof. Any suitable method can be used to solidify the glass precursor composition including, e.g., ambient drying, drying in an oven, exposure to thermal energy, exposure to radiation energy, and combinations thereof.

Useful drying conditions for an aqueous-based glass precursor composition include, e.g., heating the precursor composition to a temperature sufficient to solidify the composition to a point such that it is at least handleable, exposing the composition to radiation including, e.g., infrared radiation, ultraviolet (uv) radiation, electron beam radiation, and microwave radiation, and combinations thereof.

For glass precursor compositions that include a curable binder, the glass precursor composition can be at least partially cured (e.g., crosslinked) while it is present in the cavities of the production tool, and then, optionally, post-cured after the molded glass precursor is removed from the cavities of the production tool. The degree of cure is sufficient such that the resulting solidified, handleable glass bead precursor will retain its shape upon removal from the production tool.

Examples of sources of radiation energy for use in the curing zone include electron beam, ultraviolet light, visible light, microwave energy, infrared radiation, and laser light and combinations thereof. The amount of energy and duration of exposure can be selected based on a variety of factors including, e.g., the chemistry of the glass precursor composition, the speed of the carrier on which the composition is being transported, the distance of the radiation source from the carrier, the position of the radiation source relative to the carrier (e.g., the radiation source may be positioned so as to transmit through a carrier), ambient conditions, and combinations thereof After being at least partially solidified, the resulting solidified, handleable molded glass precursor composition can be demolded from the production tool to provide a molded microparticle. A given molded microparticle will have a shape that is essentially the shape of the mold cavity of the production tool in which the molded microparticle has been at least partially solidified. An advantage of this mode is that the molded microparticles are already of the proper size distribution, volume and shape for subsequent use. The predetermined size and shape of the molded microparticles also aids in screening and flow of the molded microparticles. Useful molded microparticle shapes include, e.g., polyhedron (e.g., cube, prism, pyramid, tetrahedron, pentahedron, hexahedron, octahederon, decahedron, parallelpiped (e.g., rhombohedron), and diamond), cylinder, arcuate, arcuate terminated cylinder, hemisphere, gumdrop, bell, conical, frusto-conical, thin body having opposed polygonal faces including, e.g., triangle, square, rectangle, rhomboid, pentagon, hexagon, heptagon, and octagon faces, and combinations thereof.

Any suitable method can be used to remove the molded microparticle from the mold cavity. For production tools that are made of a polymeric material, one useful demolding method includes exposing the filled production tool to sonic energy. Other useful demolding methods include, e.g., static charge, vacuum, air knife, other mechanical means, and combinations thereof.

For production tools made of metal, the molded microparticle can be removed from the cavities by a water jet, air jet, and combinations thereof. If the production tool has cavities that extend completely through the production tool, e.g., if the production tool is a belt having perforations extending completely therethrough, the molded microparticle can be removed by ultrasonic energy, mechanical force, water jet, air jet, combinations thereof, and other means, regardless of the material of construction of the production tool.

Alternatively, the molded microparticle is released from the production tool as a sheet that includes precisely shaped molded microparticles interconnected by a thin layer of binder material. The binder is then broken or crushed along the thin interconnecting portions to form the molded microparticles.

The molded microparticles can then be transferred directly to a source of thermal energy such as a flame. Alternatively or in addition, the molded microparticles are transferred from the production tool to a collector, from a production tool to a smooth roll, and combinations thereof, and then transferred to the thermal energy source. With respect to the smooth roll process, the molded microparticles exhibit greater adhesion to the smooth roll than to the production tool. The transferred molded microparticles are then removed from the smooth roll by various techniques including, e.g., skiing, vacuum, water jet, air jet, other mechanical means, and combinations thereof. In one particular embodiment, the molded microparticles are transferred from the production tool to a major surface of a carrier web. The molded microparticles exhibit greater adhesion to the major surface of the carrier web than to the production tool. The major surface of the carrier web to which the molded microparticles are transferred can bear a layer of material that is soluble in water or an organic solvent. The molded microparticles are then removed from the carrier web by dissolving the soluble layer, optionally in combination with a mechanical means including, e.g., skiing, vacuum, ultrasound and combinations thereof. In another methods, ultrasonic energy is applied directly over a major surface of the web or off to a side of a major surface of the web to release the molded microparticles therefrom.

In another embodiment of a method that employs a carrier web, the major surface of the carrier web includes a primer. The molded microparticles will preferentially adhere to the primed carrier web. The molded microparticles can then be removed from the primed carrier web by any suitable means including, e.g., skiing, vacuum, ultrasound, and combinations thereof. Examples of suitable primers include ethylene acrylic acid copolymer, polyvinylidene chloride, crosslinked hexanediol diacrylate, aziridine materials, and combinations thereof.

The volume of a molded microparticle preferably is at least about 50,000 $\mu m^3$, at least about 100,000 $\mu m^3$, at least about 200,000 $\mu m^3$, no greater than about 500,000 $\mu m^3$, no greater than about 300,000 $\mu m^3$, no greater than about 1,000,000 $\mu m^3$, no greater than about 8,000,000,000 $\mu m^3$, or even from about 10,000 $\mu m^3$ to about 500,000 $\mu m^3$.

The molded microparticles are then passed through a flame or other source of sufficient thermal energy (e.g., a gas-fired furnace or an electrical furnace) to form molten glass droplets. Any suitable sphere forming process and apparatus can be used including, e.g., glass, glass-ceramic, glass-bonded ceramic, and crystalline ceramic spheres manufacturing processes and apparatuses.

In one useful method, the molded microparticles are in the form of a free flowing powder and the passing involves allowing the free flowing powder to be dispersed in a flame. The flame is preferably positioned horizontally and has a temperature sufficient to transform, e.g., fuse, the glass precursors present in the molded microparticle into a homogenous state. The flame temperature is selected to be suitable for melting and fusing the molded microparticles into glass droplets. Useful flame temperatures are at least about 2000K, at least about 3000K, or even from about 3000K to about 5000K. The flame can be generated by any suitable fuel and oxidant sources including, e.g., natural gas, hydrogen, oxygen, acetylene, air, and mixtures thereof.

The duration of the molded microparticles in the flame is referred to as "residence time." The residence time is selected to achieve spheres having a desired property(s). Variables that impact the residence time include, e.g., flame velocity, flame size, flame shape, flame temperature, molded microparticle volume, the composition of the molded microparticle, the density of the molded microparticle, and the density of the sphere. The molten droplets can be maintained in the flame for a sufficient period of time to transform the molten droplets into spheres through any suitable mechanism including, e.g., directing gas currents under the molten droplets, allowing the molten droplets to fall freely through the heating zone, and combinations thereof.

The fused glass droplets form spheroids, which are then quenched to form spheres. Various quenching methods are suitable including, e.g., air cooling (e.g., by free falling through a space a sufficient distance), rapid cooling and combinations thereof. A useful rapid cooling method includes allowing the spheroids to continue their free fall through a cooling zone or into a cooling medium, e.g., water, oil or a combination thereof. Alternately or in addition, a gas (e.g., air or argon) can be sprayed into the free falling stream of fused spheroids causing the spheroids to accelerate and cool forming solid, transparent glass microbeads.

The spheres are then collected and, where desired, further processed including, e.g., screening (which is also referred to as classifying, sieving and sizing), heat treating (e.g., to allow the spheres to develop crystallinity, to form glass-ceramic, glass-bonded ceramic, and crystalline ceramic spheres and combinations thereof), fully ceraming, and combinations thereof. Useful heat treating methods are disclosed, e.g., in U.S. Pat. No. 6,245,700 and incorporated herein.

FIG. 1 illustrates an embodiment of the process 10 for making beads 34 in which the production tooling 12 in the form of a web that includes micromold cavities travels past a feed station 16 and to other stations with the aid of action by a series of rollers 18a-i. A glass precursor composition 14 in the form of a slurry that includes glass precursor and water is fed from a milling station 20 to the feed station 16 and from the feed station 16 to the cavities in the production tooling 12. The glass precursor composition 14 filled tooling 12 travels from the feed station 16 to the drying station 22 where the glass precursor composition 14 in the cavities is solidified to form molded microparticles 28. The glass precursor composition 14 filled tooling 12 then travels to a release station 24 where the output from a sonic horn 26 causes the molded microparticles 28 to be released from the cavities of the tooling 12. The molded microparticles 28 then fall a distance to a flame forming station 30 where they are melted by a flame 32 and form molten droplets. As the molten droplets continue to fall through the flame forming station 30 they harden into beads 34 and are collected.

Figure 2:
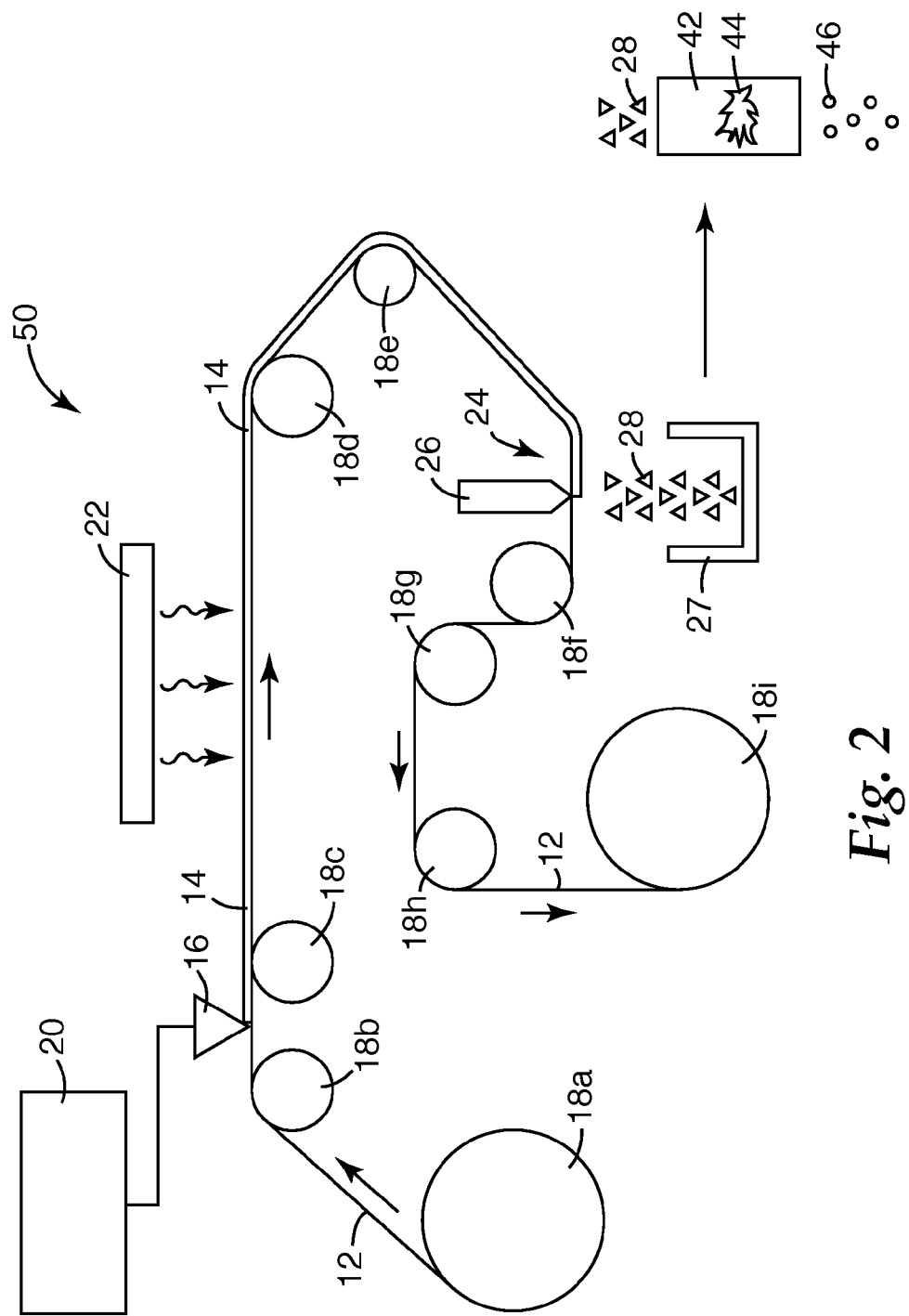
FIG. 2 is a schematic view of a process for making inorganic, metal oxide spheres using micromold tooling according to another exemplary embodiment of the invention.

FIG. 2 illustrates another embodiment of a process 50 for making beads 46. In this embodiment, the process proceeds as described above in reference to FIG. 1 with the exception that after the molded microparticles 28 are released from the cavities of the tooling 12 at release station 24 the molded microparticles 28 are collected in a container 27 and stored for future processing. Molded microparticles 28 stored in the container 27 are then fed to a flame forming station 42 where the molded microparticles 28 are melted by a flame 44 and form molten droplets. As the molten droplets continue to pass through the flame forming station 42 they harden into beads 46 and are collected. The flame forming station 42 optionally is operably coupled to the container 27. The container 27 and the flame forming station 42 can be operably coupled to each other using any suitable mechanism including, e.g., a belt feeder, to form a continuous operation.

Figure 3:
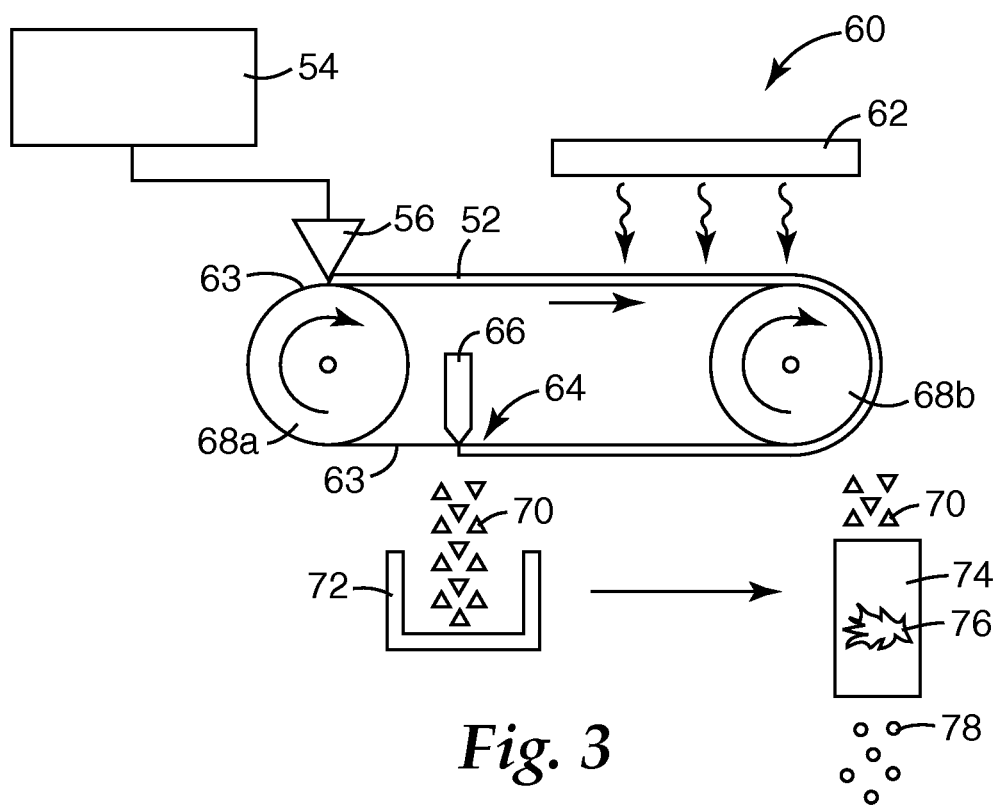
FIG. 3 is a schematic view of a process for making inorganic, metal oxide spheres using micromold tooling according to a further exemplary embodiment of the invention.

FIG. 3 illustrates a further embodiment of process 60 for making beads 78 in which the production tooling 63, which includes micromold cavities, is in the form of an endless belt that travels past feed station 56 and to other stations with the aid of action by two rollers 68a-b, at least one of which is power driven. A glass precursor composition 52 is fed from a milling station 54 to feed station 56 and from feed station 56 to the cavities in the tooling 63. The glass precursor composition 52 filled tooling 63 travels from feed station 56 to drying station 62 where the glass precursor composition 52 in the cavities is solidified to form molded microparticles 70. The filled tooling 63 then travels to a release station 64 where the output from a sonic horn 66 causes the molded microparticles 70 to be released from the cavities of the tooling 63. In this embodiment, the molded microparticles 70 that are released from the cavities of the tooling 63 at release station 64 are collected in a container 72 and stored for future processing. The molded microparticles 70 are then fed to a flame forming station 74 where the molded microparticles 70 are melted by a flame 76 and form molten droplets. As the molten droplets continue their passage through the flame forming station 74 they harden into beads 78 and are collected. The flame forming station 74 optionally is operably connected to the container 72 by a suitable mechanism including, e.g., a belt feeder, to enable a continuous operation. Alternatively, the molded microparticles 70 released at the release station 64 can be fed directly into the flame forming station 74, as depicted in FIG. 1.

Figure 4:
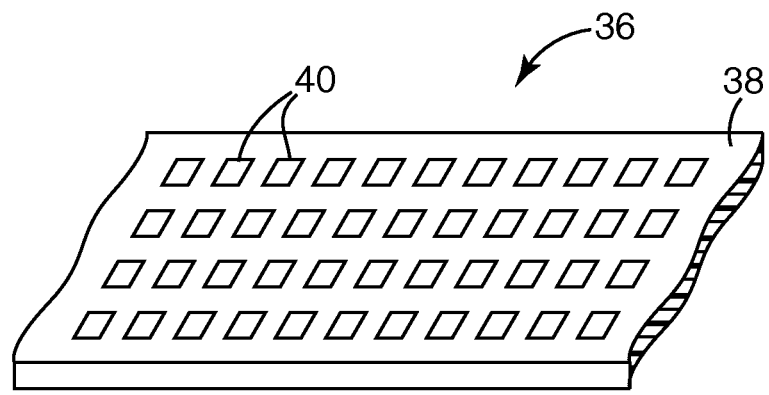
FIG. 4 is a perspective view of a portion of a production tool.

FIG. 4 illustrates an embodiment of a production tool 36 that is a three-dimensional body having at least one continuous surface 38 and a number of openings formed in the continuous surface 38. Each opening provides access to a mold cavity 40 formed in the three-dimensional body.

Spheres having a variety of properties can be formulated and prepared for use in a variety of compositions, applications, and constructions including, e.g., coatings (e.g., paints), exposed lens sheeting, encapsulated lens sheeting, embedded lens sheeting, protective materials, reflective sheeting, retroreflective sheeting, pavement-marking sheet materials (e.g., tapes), useful examples of which are described in U.S. Pat. No. 4,248,932 and incorporated herein, and other reflective and retroreflective articles including, e.g., assemblies. Examples of various useful sheeting constructions are disclosed in U.S. Pat. Nos. 2,407,680, 2,354,018 and 2,326,634, all of which are incorporated herein. Suitable assemblies are disclosed, e.g., in U.S. Pat. Nos. 5,310,278, 5,286,682, 5,268,789, and 5,227,221, all of which are incorporated herein.

In some embodiments, retroreflective articles can be used on clothing to increase the visibility of the individual by retroreflecting the incident light. The retroreflective articles that are utilized on clothing include strips of tape that are adhered to clothing with heat sensitive adhesive, patches permanently affixed or sewn to the clothing, and articles of clothing that include a retroreflective article within the clothing. Retroreflective clothing is especially useful to construction workers and exercisers who utilize roadways because these individuals are in close proximity to moving vehicles on a regular basis and the retroreflective articles make the individuals more visible to drivers under low light conditions.

Various embodiments of retroreflective articles are further described, e.g., in U.S. Pat. Nos. 4,025,159; 4,983,436; 5,064,272; 5,066,098; 5,069,964; 5,262,225; 5,674,605; 5,812,317; and 6,153,128.

Sheeting useful for pavement markings often includes, e.g., a backing, a layer of binder, and a layer of beads partially embedded in the layer of binder material. The backing can be made from a variety of materials including, e.g., polymeric films, metal foils, fiber-based sheets and combinations thereof. Suitable polymers for forming films include, e.g., acrylonitrile-butadiene polymers, millable polyurethanes, neoprene rubber, epoxies, and combinations thereof. The backing can also include particulate fillers, skid resistant particles and combinations thereof. The binder can include a variety of materials including, e.g., vinyl polymers, polyurethanes, epoxides, polyesters, colorants (e.g., inorganic pigments) and combinations thereof. The pavement marking sheeting can also include an adhesive composition (e.g., a pressure sensitive adhesive, a contact adhesive, hot melt adhesive, heat activated adhesives, and combinations thereof), on the pavement contacting surface of the backing sheet. Examples of useful pavement marking constructions and materials are described in U.S. Pat. Nos. 2,354,018, 3,915,771, 4,117,192, 4,248,932 and 4,490,432, all of which are incorporated herein.

Pavement marking sheeting can be made by a variety of known processes. A representative example of such a process includes coating onto a backing sheet a mixture of resin, pigment, and solvent, dropping spheres onto the wet surface of the backing, and curing the construction. A layer of adhesive can then be coated onto the bottom of the backing sheet. One example of a useful process for making a pavement marking sheet is described in U.S. Pat. No. 4,248,932 and incorporated herein.

In some embodiments, the spheres of the present disclosure can have an index of refraction of at least about 1.2 and no greater than about 3.0. It may be preferred that the spheres have an index of refraction of at least about 1.6 and no greater than about 2.7. It may be more preferred that the spheres have an index of refraction of at least about 1.7 and no greater than about 2.5.

The spheres can be incorporated into a variety of coating compositions as described, e.g., in U.S. Pat. Nos. 3,410,185, 3,228,897 and 2,963,378, all of which are incorporated herein. The spheres can also be used in drop-on applications for painted lines as in pavement markings.

Inorganic metal oxide bubbles are also useful in a variety of applications and compositions including, e.g., as a lightweight filler in molded polymeric products (e.g., injection-molded and extrusion-molded parts), oil-well cements (e.g., inorganic cementatious materials that harden when mixed with water) concrete, plasters, wall repair compounds, resins, paints and ceramic articles, and as a filling material in cavity walls for thermal insulation purposes. The bubbles also can be sintered together to form cellular articles including, e.g., glass bricks and other structures. The bubbles can also be filled with gaseous contents under pressure.

The invention will now be described by way of the following examples.

EXAMPLES

Example 1

A 52% solids slurry was prepared as follows: a powder was prepared by combining from 35.00 g titanium dioxide, 11.00 g silicon dioxide, 59.20 g barium carbonate, 10.71 g calcium carbonate, and 3.81 g sodium borate with mixing. To 96.07 g of the powder was added 54 g deionized water to form a 64% solids slurry. The slurry was placed in a porcelain mill jar with zirconium media and milled for four days. An additional 10 g of distilled water was added on the third day of milling and 25 g deionized water was added on the fourth day for a total of 89 g of water resulting in a slurry having 52% solids. Then 1.92 g surfactant and 8.96 g D sodium silicate liquid binder (PQ Corporation, Berwyn, Pa.) were added to the slurry.

The resulting composition was then spread by hand using a doctor blade across a tool having $2.4 \times 10^7$ cc pyramidal micromolds to fill the molds. The filled molds were set in an oven at 204.8° F. (96° C.) and dried for three hours. The molded microparticles were then removed from the mold by exposure to a sonic horn.

The molded microparticles were then fed through a one inch inner diameter copper tube with a 180μm screen at the mouth to a flame. The particles were allowed to flow by gravitation down the tube to the flame and into a stream of running water cascading down a metal incline and into a catch pan. The copper tube was tapped to facilitate flow of the particles through the tube to a flame where they formed into glass beads.

The flame was generated by a PM2D Model B Bethlehem Bench Burner having an inner ring with approximately 8.0 standard liters per minute (SLPM) hydrogen and 3.0 SLPM oxygen and an outer ring having 23.0 SLPM hydrogen and 9.8 SLPM oxygen. The flame was angled across and down the incline.

The resulting glass beads had an average diameter of 51.67 microns with a standard deviation of 11.65 and a refractive index ranging from 1.810 to 1.95, where 90% of the beads had a refractive index in the range of 1.92 to 1.95 and a majority of the beads had a refractive index of 1.94. The beads were clear. Some of the beads included voids.

What is claimed is:

1. A process for making inorganic, metal oxide spheres, the process comprising:
    forming a glass precursor composition comprising glass precursor particles dispersed in a vehicle such that the composition forms a dispersion, the vehicle including at least one of water, an organic liquid, and a binder;
    filling a plurality of mold cavities with the glass precursor composition;
    solidifying the glass precursor composition in the mold cavities to form solidified, molded microparticles;
    demolding the solidified, molded microparticles from the plurality of mold cavities, the molded microparticles each having a volume of no greater than 8,000,000,000 μm³;
    exposing the solidified, molded microparticles, after demolding, to a temperature sufficient to transform the molded microparticles into homogeneous molten glass; and
    cooling the homogeneous molten glass to form inorganic, metal oxide spheres.

2. The process of claim 1, wherein the inorganic metal oxide spheres comprise glass.

3. The process of claim 1, wherein the molded microparticles comprise binder and particulate.

4. The process of claim 3, wherein the binder comprises at least one of cellulose, polymer, and actinic radiation curable resin.

5. The process of claim 1, wherein the exposing comprises:
    passing the molded microparticles through a chamber having a temperature sufficient to melt the solidified, molded microparticles;
    melting the molded microparticles; and
    rendering the melted particles substantially spherical.

6. The process of claim 1, further comprising maintaining the homogeneous molten glass at or above the transforming temperature for a sufficient period of time such that the homogeneous molten glass forms into spherical molten droplets.

7. The process of claim 1, wherein the exposing comprises exposing the molded microparticles to a temperature of at least 2000 K.

8. The process of claim 1, wherein the demolding comprises exposing the molded microparticles to at least one of emissions from a sonic horn and sonic energy.

9. The process of claim 1,
    wherein solidifying the glass precursor composition includes
    exposing the composition to an energy source to at least partially solidify the composition.

10. The process of claim 1, wherein the vehicle comprises a binder comprising at least one of cellulose, thermoplastic polymer, and actinic radiation curable resin.

11. The process of claim 1, wherein each mold cavity defines a volume no greater than about 880,000,000 cubic micrometers.

12. The process of claim 1, wherein each mold cavity defines a shape comprising at least one of polyhedron, parallelpiped, cylinder, arcuate, arcuate terminated cylinder, hemisphere, gumdrop, bell, cone, and frusto-conical cone.

13. The process of claim 1, wherein the plurality of mold cavities is present on a three-dimensional body having at least one continuous surface comprising a plurality of openings at least some of which provide access to the mold cavities, the mold cavities extending into the three-dimensional body.

14. The process of claim 13, wherein the three-dimensional body comprises polymer, metal, ceramic or a combination thereof.

15. The process of claim 1, wherein the plurality of mold cavities is present on a belt, a web, a cylindrical coating roll, a sheet, a sleeve, or a combination thereof.

16. The process of claim 1, wherein the plurality of mold cavities further comprises a release agent.

17. The process of claim 1, wherein the glass precursor comprises particles comprising oxides of at least one of silicon, aluminum, zirconium, titanium, boron, lanthanum, sodium, potassium, calcium, magnesium, and barium.

18. The process of claim 1, wherein the inorganic, metal oxide spheres have an average cross-sectional dimension no greater than about 500 micrometers.

19. The process of claim 1, wherein the inorganic, metal oxide spheres have an average cross-sectional dimension no greater than 100 micrometers.

20. The process of claim 1, wherein the inorganic, metal oxide spheres have an average cross-sectional dimension no greater than 60 micrometers.

21. The process of claim 1, wherein the molded microparticles exhibit a shape comprising at least one of polyhedron, parallelpiped, diamond, cylinder, arcuate, arcuate terminated cylinder, sphere, hemisphere, gumdrop, bell, cone, and frusto-conical cone.

22. The process of claim 1, wherein the inorganic, metal oxide spheres are hollow, transparent or a combination thereof 23. The process of claim 1, wherein the resulting spheres formed by the process have a mean sphere diameter, and wherein the resulting spheres exhibit an average absolute deviation from the mean sphere diameter of less than 20% prior to a screening step.

24. The process of claim 1, wherein the resulting spheres formed by the process have a mean sphere diameter, and wherein the resulting spheres exhibit an average absolute deviation from the mean sphere diameter of less than 10% prior to a screening step.

25. The process of claim 1, wherein the resulting spheres formed by the process have an index of refraction of at least about 1.2.

26. A process for making glass microspheres, the process comprising:

forming a glass precursor composition comprising glass precursor particles dispersed in a vehicle such that the composition forms a dispersion, the vehicle including at least one of water, an organic liquid, and a binder;

filling a plurality of mold cavities with the glass precursor composition;

solidifying the glass precursor composition in the mold cavities to form solidified, molded microparticles;

demolding the solidified, molded microparticles from the plurality of mold cavities, the molded microparticles each having a volume of no greater than 8,000,000,000 μm$^3$;

exposing the solidified, molded microparticles, after demolding, to a temperature sufficient to transform the molded microparticles into homogeneous molten glass droplets;

maintaining the homogeneous molten glass droplets at or above the transforming temperature for a sufficient period of time such that the droplets form into spheres; and cooling the homogeneous molten glass droplets to form glass microspheres.

27. The process of claim 26, wherein the glass microspheres comprise microbubbles.

28. The process of claim 26, wherein the glass microspheres comprise microbeads.

29. The process of claim 1, wherein the plurality of mold cavities is formed in a production tool, and wherein the production tool is formed of a polyolefin, a polyamide, a polyimide, a metal, a ceramic, or a combination thereof.

30. The process of claim 1, wherein the vehicle is present in the glass precursor composition in an amount of from about 20% by weight.

31. The process of claim 1, wherein each mold cavity has a volume V according to the following equation:

$$V = 4/3(\pi)(D/2)^3 \div (\% \text{ solids}) \div (\% \text{ densification})$$

where D is the desired diameter of the inorganic, metal oxide spheres, % solids refers to the % solids present in the glass precursor composition, and % densification is the amount of volume shrinkage expected from the glass precursor composition.

* * * * *

UNITED STATES PATENT AND TRADEMARK OFFICE
CERTIFICATE OF CORRECTION

| | |
|---|---|
| PATENT NO. | : 8,701,441 B2 |
| APPLICATION NO. | : 11/465848 |
| DATED | : April 22, 2014 |
| INVENTOR(S) | : David Kramlich |

It is certified that error appears in the above-identified patent and that said Letters Patent is hereby corrected as shown below:

On the Title Page

(75) (Inventors)

Delete "Kathleen M. Schakel-Carlson," and insert -- Kathleen M. Shakel-Carlson, --, therefor.

In the Specification

Column 5

Line 25, delete "galactomanan" and insert -- galactomannan --, therefor.

Column 5

Line 26, delete "derivates," and insert -- derivatives, --, therefor.

Column 5

Line 37, delete "carragenan," and insert -- carrageenan, --, therefor.

Column 6

Line 25, delete "pentaerthyitol" and insert -- pentaerythritol --, therefor.

Column 6

Lines 35-36, delete "methyacryloxyethyl" and insert -- methacryloxyethyl --, therefor.

Signed and Sealed this
Eighth Day of July, 2014

Michelle K. Lee
*Deputy Director of the United States Patent and Trademark Office*

Column 7

Line 10, delete "hydrozones," and insert -- hydrazones, --, therefor.

Column 7

Line 66, delete "octahederon," and insert -- octahedron, --, therefor.

Column 7

Lines 66-67, delete "parallelpiped" and insert -- parallelepiped --, therefor.

Column 9

Line 26, after "silicone-based" delete "based".

Column 10

Line 52, delete "octahederon," and insert -- octahedron, --, therefor.

Column 10

Line 52, delete "parallelpiped" and insert -- parallelepiped --, therefor.

Column 11

Line 22, delete "skiing," and insert -- skiving --, therefor.

Column 11

Line 33, delete "skiing," and insert -- skiving --, therefor.

Column 11

Line 43, delete "skiing," and insert -- skiving --, therefor.

Column 12

Line 36, delete "ceraming" and insert -- ceramic --, therefor.

Column 14

Line 51, delete "cementatious" and insert -- cementitious --, therefor.

CERTIFICATE OF CORRECTION (continued)
U.S. Pat. No. 8,701,441 B2

<u>In the Claims</u>

<u>Column 16</u>

Lines 26-27, In Claim 12, delete "parallelpiped" and insert -- parallelepiped --, therefor.

<u>Column 16</u>

Line 57, In Claim 21, delete "parallelpiped" and insert -- parallelepiped --, therefor.